Figure 1:
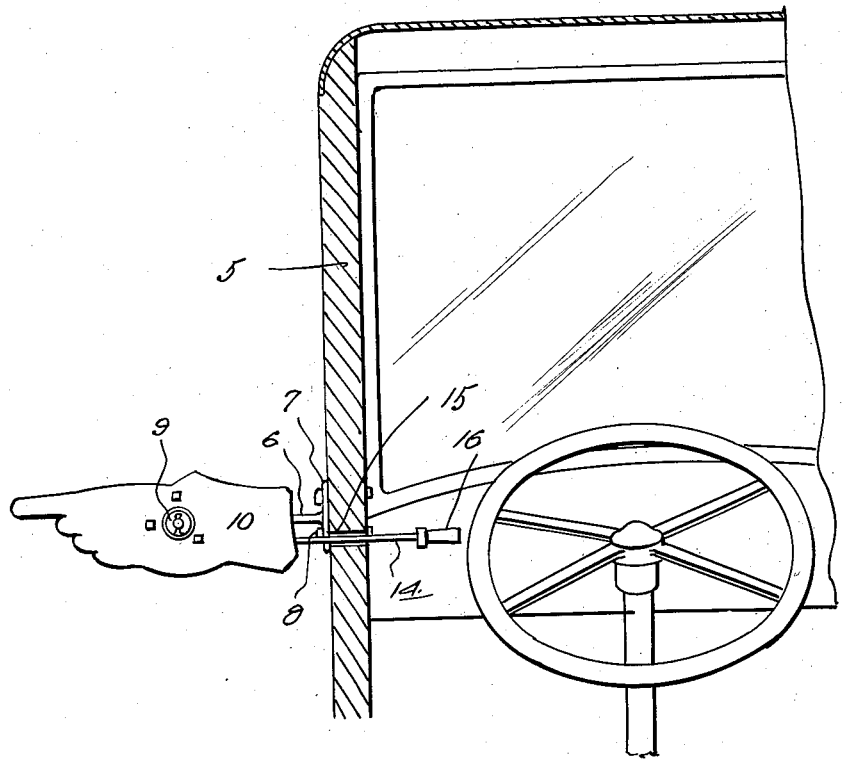

Oct. 21, 1930.　　J. E. SMITH　　1,778,918
VEHICLE SIGNAL
Filed May 27, 1930　　2 Sheets-Sheet 1

Inventor
John E. Smith

By Clarence A. O'Brien
Attorney

Oct. 21, 1930.   J. E. SMITH   1,778,918
VEHICLE SIGNAL
Filed May 27, 1930   2 Sheets-Sheet 2

Inventor
John E. Smith

By Clarence A. O'Brien
Attorney

Patented Oct. 21, 1930

1,778,918

UNITED STATES PATENT OFFICE

JOHN E. SMITH, OF ARCO, IDAHO

VEHICLE SIGNAL

Application filed May 27, 1930. Serial No. 456,160.

The present invention relates to a signal to be used on vehicles and particularly automobiles and the prime object of the invention resides in the provision of means whereby the driver of an automobile may give a signal for a left hand turn without the necessity of extending his hand out of the side window adjacent to him as is the common practice.

Another very important object of the invention resides in the provision of a signal apparatus of this nature which is exceedingly simple in its construction, inexpensive to manufacture and install, easy to manipulate, compact and convenient in its arrangement of parts, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 4:
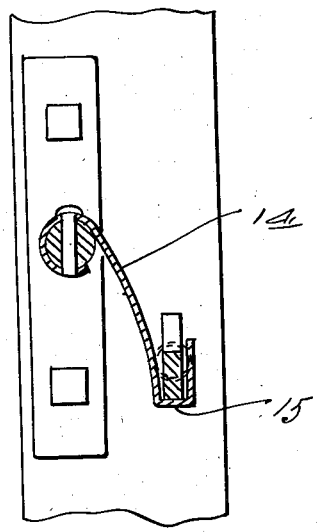
Figure 2:
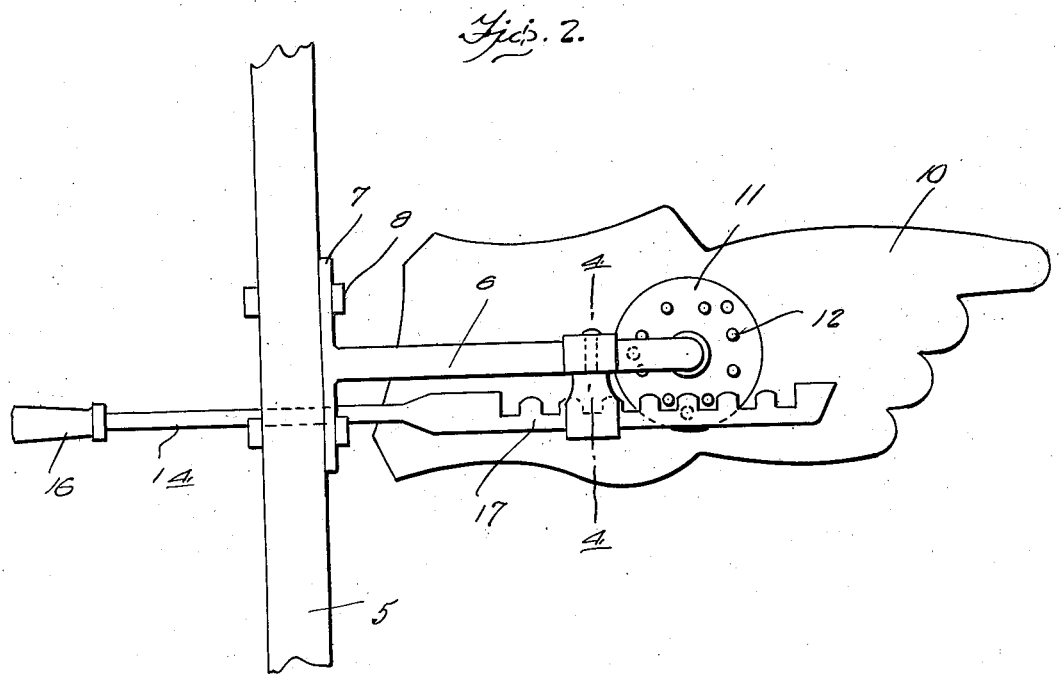
Figure 3:
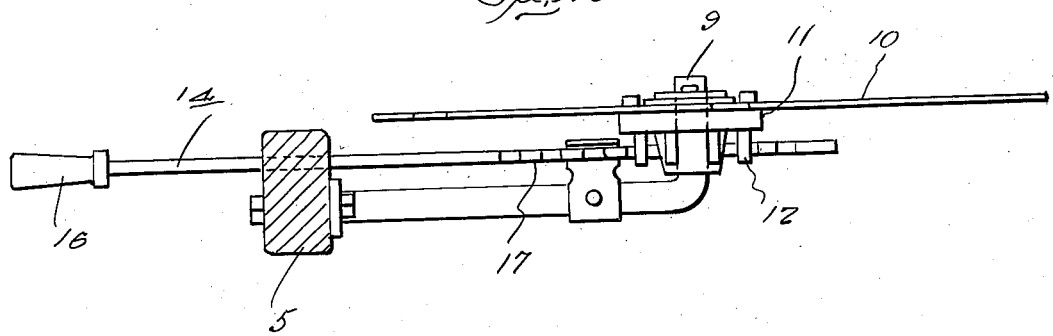

In the drawing:

Figure 1 is a sectional view through the front portion of an automobile showing my signal apparatus in rear elevation, Figure 2 is a front elevation of the signal apparatus, Figure 3 is a top plan view thereof, and Figure 4 is a detail sectional view taken substantially on the line 4—4 of Figure 2.

Referring to the drawings in detail it will be seen that the numeral 5 denotes the left side of a vehicle body such as an automobile adjacent the driver's seat. A bracket 6 is provided with gears 7 at one end bolted or otherwise secured as at 8 to the outside of the side 5 so that the bracket arm 6 projects outwardly. This arm 6 terminates in a lateral extension 9 which in the present instance is directed rearwardly and horizontally.

A hand simulating signalling plate 10 is rockable on this extension 9 and has a disk 11 fixed thereto and also rockable about the extension 9 and this disk is provided with an annular series of pins 12 projecting therefrom.

A guide 14 is secured to the arm 6 and terminates in a channel portion 15 which slidably supports a rack 17 for engaging the pins or teeth 12. This rack terminates in a rod 14 which is slidable through an opening 15 in the side 5 and on the inner end of the rod is a handle 16 adjacent the steering wheel so that the handle may be moved outwardly or inwardly. When the handle is moved outwardly it will be seen that the hand simulating signalling plate is pointed outwardly and when the handle is moved inwardly, the signal is pointed downwardly.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantages as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A signalling apparatus of the class described, a bracket arm terminating at one end in a lateral extension, a signalling plate rockable on the extension, a disk on the plate circumjacent the extension, an annular series of pins projecting from the plate concentrically disposed about the extension, a rack, said rack engaging the pins, and means for supporting the rack.

2. A signalling apparatus of the class described, a bracket arm terminating at one end in a lateral extension, a signalling plate rockable on the extension, a disk on the plate circumjacent the extension, an annular series of pins projecting from the plate concentrically disposed about the extension, a rack, said rack engaging the pins, a guide member on the bracket and having a channel in which the rack is slidable.

3. A signalling apparatus of the class described, a bracket arm terminating at one end in a lateral extension, a signalling plate rockable on the extension, a disk on the plate circumjacent the extension, an annular series of pins projecting from the plate concentrically disposed about the extension, a rack, said rack engaging the pins, a guide member on the bracket and having a channel in which the rack is slidable, one end of the rack merging into a rod having a handle on the end thereof.

In testimony whereof I affix my signature.

JOHN E. SMITH.